Patented Nov. 9, 1926.

1,606,209

UNITED STATES PATENT OFFICE.

GUILLAUME DE MONTMOLLIN, FRITZ STRAUB, AND JOSEPH SPIELER, OF BASEL, SWITZERLAND, ASSIGNORS TO SOCIETY OF CHEMICAL INDUSTRY IN BASLE, OF BASEL, SWITZERLAND.

AZO DYESTUFF FROM BARBITURIC ACID AND PROCESS OF MAKING THE SAME.

No Drawing. Application filed December 1, 1925, Serial No. 72,579, and in Switzerland December 24, 1924.

The present invention relates to new dyestuffs containing chromium, valuable for the production of fast tints; it comprises the new products, the different steps of their process of manufacture, and the material dyed with the dyestuffs.

We have found that the barbituric acid corresponding with the general formula:

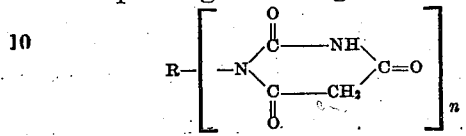

wherein R stands for a hydrogen atom, an alkyl, aryl or aralkyl residue and $n$ for a whole number not higher than 2, may be combined with ortho-hydroxydiazo compounds. There are thus obtained new mordant dyestuffs, which form yellow to brownish-red powders, dissolving in dilute sodium carbonate solution with yellow to brownish-red coloration and dyeing wool in an acid bath yellow to red and brown tints which may change to brown and to red by after-chroming yielding thus tints fast to milling and potting, and very fast to light. The dyestuffs correspond with the general formula:

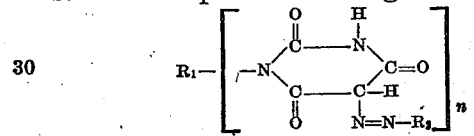

wherein $R_1$ stands for a hydrogen atom, an alkyl, aryl or aralkyl residue, $n$ for a whole number not higher than 2, and $R_2$ for an aromatic residue carrying an OH-group in ortho position to the azobridge. The value of these new dyestuffs, however, resides in the fact of their convertibility into new acid dyestuffs by treatment with agents yielding chromium such as the oxides, hydroxides or salts of the trivalent chromium, forming thus in a dry state, yellow to dark-brown and black powders, dissolving in dilute sodium carbonate solution to yellow-brown, red and pink solutions, and dyeing wool in an acid bath level and fast yellow to orange, brown and red or pink tints.

The barbituric acids employed in the present invention may be prepared quite generally by condensing urea or the ureas of the general formula $R-(NH.CO.NH_2)n$, wherein R stands for alkyl, aralkyl and aryl residues, and $n$ for a whole number not higher than 2, with esters of the malonic acid.

In this manner there may be obtained from the corresponding ureas among others the following barbituric acids:

| Urea. | Barbituric acid. | Melting point, or temperature of decomposition. | |
|---|---|---|---|
| | | Raw product. | Recrystallized from glacial acetic acid. |
| I. Phenylurea | Phenylbarbituric acid. | 264° | 266° |
| II. o-Tolylurea | o-Tolylbarbituric acid. | 244° | 246° |
| III. p-Tolylurea | p-Tolylbarbituric acid. | 244° | 245° |
| IV. p-Chlorophenylurea. | p-Chlorophenyl-barbituric acid. | 236° | 238° |
| V. o-Methoxyphenylurea. | o-Methoxyphenyl-barbituric acid. | 263° | 263° |
| VI. m-Nitrophenylurea. | m-Nitrophenyl-barbituric acid. | 216° | 224° |
| VII. p-Nitrophenylurea. | p-Nitrophenyl-barbituric acid. | 262° | 264° |
| VIII. α-Naphthylurea. | α-Naphthylbar-bituric acid. | 233° | 236° |
| IX. β-Naphthylurea. | β-Naphthylbar-bituric acid. | 245° | 246° |
| X. o-Carboxyphenylurea. | o-Carboxyphenyl-barbituric acid. | 267° | 276° |
| XI. 4-Hydroxy-3-carboxyphenylurea. | 4-Hydroxy-3-car-boxyphenylbar-bituric acid. | 260° | 272° |
| XII. p-Aminophenylurea. | p-Aminophenyl-barbituric acid. | Above 300° | Above 300° |
| XIII. Diphenyl-4,4'-diurea (from benzidine). | Diphenyl-4,4'-di-barbituric acid. | Above 300° | Above 300° |
| XIV. 3,3'-Ditolyl-4,4'-diurea (from tolidine). | 3,3'-Ditolyl-4,4'-dibarbituric acid. | Above 300° | Above 300° |

The barbituric acid derived from the urea number XIII corresponds with the formula

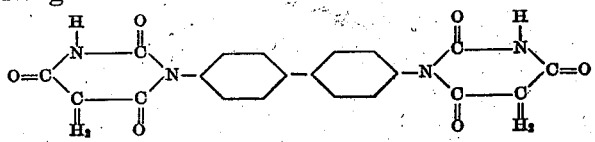

Example 1.

233 parts of 4-sulfo-2-amino-1-phenol-6-carboxylic acid are diazotized as usual and introduced into a mixture of 134 parts of barbituric acid, 133 parts of caustic soda solution of 30% strength, 170 parts of sodium carbonate and 1500 parts of water. Coupling takes place immediately. In order to activate the latter the whole is stirred for some time. The dyestuff thus obtained is then filtered. It forms, in a dry state, an orange powder, dissolving in water to a yellowish-orange solution by addition of sodium carbonate solution, and dyes wool, from an acid bath, yellow tints changing to brownish-yellow and becoming fast by afterchroming. The dyestuff corresponds most probably with the following formula:

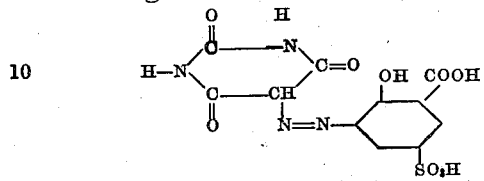

Example 2.

232 parts of 4-sulfo-2-amino-1-phenol-6-carboxylic acid are diazotized as usual and introduced into a solution of 160 parts of ethylbarbituric acid and 250 parts of sodium carbonate in 2000 parts of water. The whole is stirred for some time and the dyestuff obtained filtered. In a dry state it forms an orange powder, dissolving in water to an orange solution by addition of sodium carbonate solution, and dyeing wool from an acid bath yellow tints changing to brownish-orange by after-chroming. The new dyestuff corresponds most probably with the following formula:

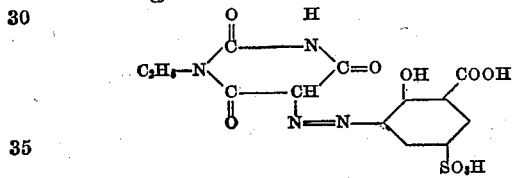

Example 3.

224 parts of 4-chloro-2-amino-1-phenol-5-sulfonic acid are diazotized as usual and introduced into a solution of 230 parts of benzylbarbituric acid, 140 parts of caustic soda solution of 30% strength, 2000 parts of water and 100 parts of carbonate of soda. After some time the formation of the dyestuff is accomplished, it is filtered and dried.

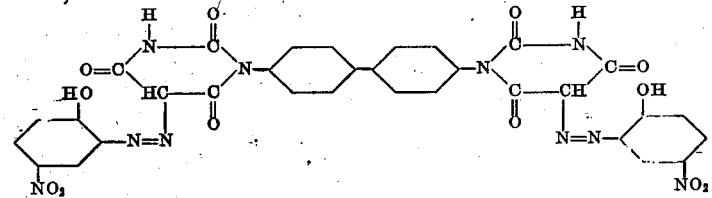

is filtered and dried. It forms a brown powder, dissolving in dilute sodium carbonate solution with yellow coloration and dyeing wool from an acid bath orange tints changing to brown by afterchroming.

Example 6.

32,8 parts of the dyestuff made from diazotized 2-amino-1-phenol-4-sulfonic acid and barbituric acid are dissolved in 650 parts of boiling water and treated with a solution of chromium formate corresponding The dyestuff forms a brown powder and dyes wool from an acid bath yellowish-brown tints changing to brick-red by afterchroming. The dyestuff corresponds very probably with the following formula:

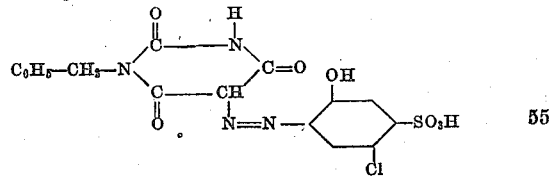

Example 4.

224 parts of 4-chloro-2-amino-1-phenol-5-sulfonic acid are diazotized as usual and introduced into a solution from 214 parts of phenylbarbituric acid, 135 parts caustic soda solution of 30% strength and 100 parts of sodium carbonate in 2000 parts of water. Coupling occurs instantly and after some stirring the whole diazo compound has disappeared. The dyestuff thus obtained is then salted out as usual, filtered and dried. It forms a red-brown powder, dissolving in water by addition of sodium carbonate with orange coloration and dyeing wool from an acid bath yellow tints changing to orange by afterchroming. The dyestuff corresponds very probably with the following formula:

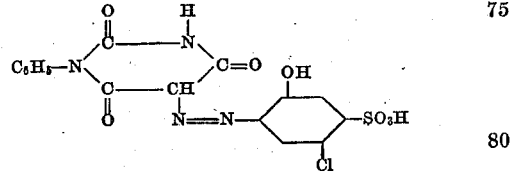

Example 5.

154 parts of 4-nitro-2-aminophenol are diazotized as usual and introduced into an aqueous solution containing 203 parts of diphenyldibarbituric acid, 250 parts of sodium carbonate and 2000 parts of water. Coupling occurs rapidly and the dyestuff thus obtained corresponding with the formula:

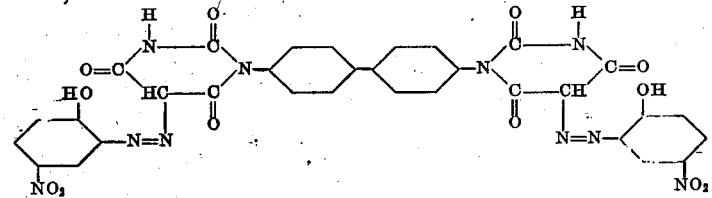

with 15,2 parts of $Cr_2O_3$. The whole is boiled for some hours in a reflux apparatus, partly evaporated and the new chromium compound isolated as usual. It forms a brown powder, dissolving in dilute sodium carbonate solution with yellow coloration, and dyeing wool from an acid bath fast reddish-yellow tints.

Example 7.

100 parts of a chromium hydroxide paste corresponding with 12,3 parts of $Cr_2O_3$, 28 parts of potassium hydroxide and 10 parts of glycerine are heated until solution is complete. The mass is then treated with 32,8 parts of the dyestuff made from diazotized 2-amino-1-phenol-4-sulfonic acid and barbituric acid and boiled for 10 hours in a reflux apparatus. The reaction mixture is then diluted with about 20 parts of water separated from the excess of chromium hydroxide, neutralized with mineral acid and the new chromium compound is isolated by evaporation or salting out. It forms a brown powder, dissolving in dilute sodium carbonate solution with yellow coloration, dyeing wool from an acid bath reddish-yellow tints.

Example 8.

37,2 parts of the dyestuff made from diazotized 4-sulfo-2-amino-1-phenol-6-carboxylic acid and barbituric acid are dissolved in 600 parts of water, treated with a solution of chromium formate corresponding with 15,2 parts of $Cr_2O_3$ and boiled for some time in a reflux apparatus. The reaction mixture is partly evaporated and the dyestuff thus obtained isolated as usual. It forms an orange brown powder, dissolving in dilute sodium carbonate solution with yellow-orange coloration, dyeing wool from an acid bath fast orange tints.

Example 9.

43,8 parts of the dyestuff made from diazotized 4-chloro-2-amino-1-phenol-5-sulfonic acid and barbituric acid are dissolved in 800 parts of a solution of chromium fluoride corresponding with 15,2 parts of $Cr_2O_3$, and boiled for some time in a reflux apparatus. The dyestuff containing chromium thus obtained is isolated either by evaporation or salting out. It forms an orange-brown powder, dissolving in dilute sodium carbonate solution with yellow-orange coloration, dyeing wool from an acid bath fast orange tints.

In an analogous manner there may be obtained yellow to red and brown dyestuffs containing chromium from further o-hydroxyazodyestuffs derived from other barbituric acids.

The following table gives the properties of some of the dyestuffs of the present invention and of the corresponding mordant dyestuffs:

| Barbituric acid. | o-Hydroxyamino compound. | Mordant dyestuff. | | | | Chromium compound. | | |
|---|---|---|---|---|---|---|---|---|
| | | Color of the dry dyestuff. | Color in dilute soda solution. | Acid dyeing. | After-chromed dyeing. | Dyestuff powder. | Color in dilute soda solution. | Color of acid dyeing on wool. |
| I. Barbituric acid | 2-Amino-1-phenol-4-sulfonic acid. | Brown | Yellow-orange. | Yellow | Brown-yellow. | Brown | Yellow | Reddish-yellow. |
| II. Barbituric acid | 6-Nitro-2-amino-1-phenol-4-sulfonic acid. | Yellow | Yellow-orange. | Red | Brown-yellow. | Yellow-brown. | Orange-yellow. | Reddish-yellow. |
| III. Barbituric acid | 4-Chloro-2-amino-1-phenol-6-carboxylic acid. | Yellow-brown. | Yellow-orange. | Yellow | Brown-orange. | Yellow-brown. | Orange | Reddish-yellow. |
| IV. Barbituric acid | 4-Nitro-2-amino-1-phenol. | Yellow-brown. | Yellow-orange. | Brown-yellow. | Brown | Brown | Yellow | Brown-orange. |
| V. Barbituric acid | 4-chloro-2-amino-1-phenol. | Brown | Yellow-orange. | Yellow | Brown-orange. | Brown | Yellow | Orange. |
| VI. Barbituric acid | 2-amino-1-phenol-4-sulfamide. | Brown | Orange | Reddish-yellow. | Yellow-brown. | Brown | Reddish-yellow. | Yellow-orange. |
| VII. Barbituric acid | 1-amino-2-hydroxy-naphthalene-4-sulfonic acid. | Brown | Red | Brown | Brown | Reddish-brown. | Pink | Pink. |
| VIII. Barbituric acid | Nitrated diazo compound of 1-amino-2-hydroxynaphthalene-4-sulfonic acid. | Brown | Brown-red. | Brown | Brown | Brown | Orange-red. | Red. |
| IX. Phenylbarbituric acid. | 2-amino-1-phenol-4-sulfonic acid. | Red-brown. | Orange | Yellow | Brown-yellow. | Brown | Yellow | Reddish-yellow. |
| X. Phenylbarbituric acid. | 4-chloro-2-amino-1-phenol-5-sulfonic acid. | Brown | Orange | Yellow | Orange | Brown | Yellow-orange. | Reddish-orange. |
| XI. Phenylbarbituric acid. | 4-nitro-2-amino-1-phenol-6-sulfonic acid. | Red-brown. | Yellow | Orange | Yellow | Brown | Yellow | Yellow-orange. |
| XII. Phenylbarbituric acid. | 4-sulfo-2-amino-1-phenol-6-carboxylic acid. | Orange | Yellow-orange. | Yellow | Yellow | Brown | Yellow | Yellow. |
| XIII. Phenylbarbituric acid. | 1-amino-2-hydroxynaphthalene-4-sulfonic acid. | Brown | Red | Brown | Red | Blackish | Pink | Pink. |
| XIV. Phenylbarbituric acid. | Nitrated diazo compound of 1-amino-2-hydroxynaphthalene-4-sulfonic acid. | Brown | Brown-red. | Brown | Brown | Brown | Brown-red. | Reddish-brown. |
| XV. o-Tolylbarbituric acid. | 2-Amino-1-phenol-4-sulfonic acid. | Brown | Orange | Yellow | Brown-yellow. | Brown | Yellow | Orange. |
| XVI. p-Tolylbarbituric acid. | 4-Chloro-2-amino-1-phenol-5-sulfonic acid. | Brown | Red | Brown | Orange | Reddish-brown. | Orange | Red-orange. |
| XVII. p-Chloro-phenyl-barbituric acid. | 4-Nitro-2-amino-1-phenol-6-sulfonic acid. | Yellow | Orange | Yellow-orange. | Yellow-brown | Brown | Yellow-orange. | Yellow-orange. |
| XVIII. o-Methoxy-phenylbarbituric acid. | 4-Nitro-2-amino-1-phenol-6-sulfonic acid. | Yellow | Yellow | Orange | Yellow | Brown | Yellow | Orange. |
| XIX. p-Nitro-phenyl-barbituric acid. | 4-Chloro-2-amino-1-phenol-5-sulfonic acid. | Brown | Orange-red. | Orange-red. | Orange | Reddish-brown. | Orange | Reddish-orange. |
| XX. α-Naphthylbarbituric acid. | 2-Amino-1-phenol-4-choloro-5-sulfonic aid. | Brown | Orange-red. | Brownish-yellow. | Orange | Brown | Red-orange. | Red-orange. |
| XXI. β Naphthylbarbituric acid. | 4-Nitro-2-amino-1-phenol-6-sulfonic acid. | Orange | Yellow | Yellow-orange. | Brown-yellow. | Yellowish-brown. | Yellow | Reddish-yellow. |
| XXII. 4-Hydroxy-phenyl-3-carboxy-barbituric acid. | 6-Nitro-2-amino-1-phenol-4-sulfonic acid. | Brown | Orange | Red | Brown | Brown | Brownish-orange. | Brownish-orange. |

The dyestuff number VIII corresponds with the formula:

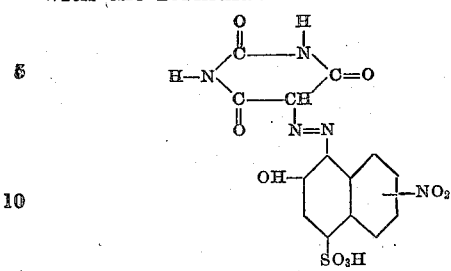

The dyestuff number XX corresponds with the formula:

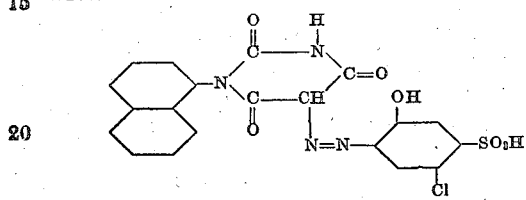

What we claim is:

1. As step in the production of new acid dyestuffs the herein described coupling of the barbituric acids corresponding with the general formula:

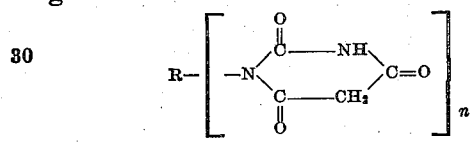

wherein R stands for a hydrogen atom, aryl, alkyl or aralkyl residues and $n$ for a whole number not higher than 2, with o-hydroxy diazo compounds.

2. As step in the production of new acid dyestuffs the herein described coupling of the barbituric acids corresponding with the general formula:

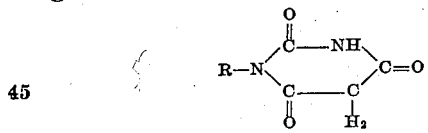

wherein R stands for a hydrogen atom, aryl, alkyl or aralkyl residues with o-hydroxy diazo compounds.

3. As step in the production of new acid dyestuffs the herein described treatment of mordant dyestuffs corresponding with the general formula:

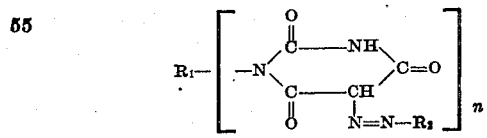

wherein $R_1$ stands for a hydrogen atom, aryl, alkyl or aralkyl residues, $n$ for a whole number not higher than 2, and $R_2$ for an aromatic residue carrying an OH-group in ortho-position to the azobridge, with compounds of trivalent chromium.

4. As step in the production of new acid dyestuffs the herein described treatment of mordant dyestuffs corresponding with the general formula:

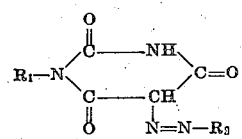

wherein $R_1$ stands for a hydrogen atom, aryl, alkyl or aralkyl residues, and $R_2$ for an aromatic residue carrying an OH-group in ortho-position to the azobridge, with compounds of trivalent chromium.

5. As step in the production of new acid dyestuffs the herein described treatment of mordant dyestuffs corresponding with the general formula:

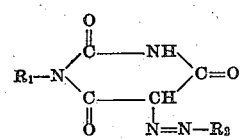

wherein $R_1$ stands for a hydrogen atom, aryl, alkyl or aralkyl residues, and $R_2$ an aromatic residue of the benzene series carrying an OH-group in ortho-position to the azobridge, with compounds of trivalent chromium.

6. As new products the herein described new chromium compounds, derivatives of the dyestuffs corresponding with the general formula:

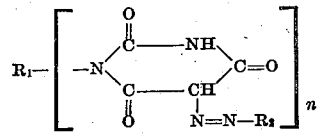

wherein $R_1$ stands for a hydrogen atom, aryl, alkyl or aralkyl residues, $n$ for a whole number not higher than 2, and $R_2$ for an aromatic residue carrying an OH-group in ortho-position to the azobridge, which dyestuffs form yellow to brownish-red powders, dissolving in dilute sodium carbonate solution with yellow to brownish-red and pink coloration, and dyeing wool in an acid bath fast yellow to reddish-orange, pink and brown tints.

7. As new products the herein described new chromium compounds, derivatives of the dyestuffs corresponding with the general formula:

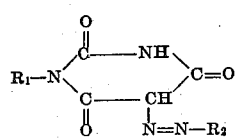

wherein $R_1$ stands for a hydrogen atom, aryl, alkyl or aralkyl residues, and $R_2$ for an aromatic residue carrying an OH-group in ortho-position to the azobridge, which dyestuffs form yellow to brownish-red powders, dissolving in dilute sodium carbonate solution with yellow to brownish-red and pink coloration, and dyeing wool in an acid bath fast yellow to reddish-orange, pink and brown tints.

8. As new products the herein described new chromium compounds, derivatives of the dyestuffs corresponding with the general formula:

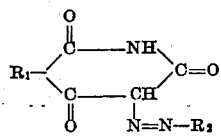

wherein $R_1$ stands for a hydrogen atom, aryl, alkyl or aralkyl residues, and $R_2$ for an aromatic residue of the benzene series carrying an OH-group in ortho-position to the azobridge, which dyestuffs form yellow to brownish-red powders, dissolving in dilute sodium carbonate solution with yellow to brownish-red and pink coloration, and dyeing wool in an acid bath fast yellow to reddish-orange, pink and brown tints.

9. Material dyed with the dyestuffs of claim 6.

10. Material dyed with the dyestuffs of claim 7.

11. Material dyed with the dyestuffs of claim 8.

In witness whereof we have hereunto signed our names this 21st day of November 1925.

GUILLAUME DE MONTMOLLIN.
FRITZ STRAUB.
JOSEPH SPIELER.